US012668307B2

(12) United States Patent
Imamura et al.

(10) Patent No.: US 12,668,307 B2
(45) Date of Patent: Jun. 30, 2026

(54) VEHICULAR SIDE STRUCTURE

(71) Applicant: TOYODA IRON WORKS CO., LTD.,
Aichi (JP)

(72) Inventors: Yousuke Imamura, Aichi (JP); Takeshi Taniguchi, Aichi (JP)

(73) Assignee: TOYODA IRON WORKS CO., LTD.,
Aichi (JP)

( * ) Notice: Subject to any disclaimer, the term of this patent is extended or adjusted under 35 U.S.C. 154(b) by 358 days.

(21) Appl. No.: 18/259,835

(22) PCT Filed: Feb. 2, 2022

(86) PCT No.: PCT/JP2022/004064
§ 371 (c)(1),
(2) Date: Jun. 29, 2023

(87) PCT Pub. No.: WO2022/168873
PCT Pub. Date: Aug. 11, 2022

(65) Prior Publication Data
US 2024/0083510 A1      Mar. 14, 2024

(30) Foreign Application Priority Data

Feb. 3, 2021      (JP) ................................. 2021-015597

(51) Int. Cl.
*B62D 21/15* (2006.01)
*B62D 25/02* (2006.01)
*B62D 27/02* (2006.01)

(52) U.S. Cl.
CPC ......... *B62D 21/157* (2013.01); *B62D 25/025* (2013.01); *B62D 27/023* (2013.01)

(58) Field of Classification Search
CPC .............. B62D 25/025; B62D 25/2036; B62D 21/157; B62D 27/023; B60K 1/04; B60K 2001/0438
(Continued)

(56) References Cited

U.S. PATENT DOCUMENTS 8,322,780 B2 * 12/2012 Nagwanshi .......... B62D 29/005
296/187.03
9,868,361 B2 * 1/2018 Barbat .................... B60L 50/66
(Continued)

FOREIGN PATENT DOCUMENTS

CN        110155180 A       8/2019
CN        111886711 A      11/2020
(Continued)

OTHER PUBLICATIONS

EESR issued on Oct. 10, 2024 for the corresponding EP Patent Application No. 22749744.3.
(Continued)

*Primary Examiner* — Amy R Weisberg
(74) *Attorney, Agent, or Firm* — Miki Motohashi Iino; Millen, White, Zelano & Branigan, P.C.

(57) ABSTRACT

A vehicle side structure includes: a rocker extending in a front-and-rear direction of a vehicle; and an impact absorbing member adjacent to the rocker. The rocker includes a tubular inner space formed by joining a rocker inner panel and a rocker outer panel, which are made of a steel sheet having a hat-shaped cross section, in such a manner as to face each other. The rocker includes an undersurface forming a step shape in such a manner that a downward extending space is formed in the inner space of the rocker. The impact absorbing member is placed adjacent to and inward in a vehicle width direction relative to the downward extending space. A load transfer member is provided within the downward extending space, the load transfer member having an elongated shape extending along the rocker and forming a closed cross-sectional portion by being joined to either the rocker inner panel or the rocker outer panel. Impact load from the outside in the vehicle width direction is transferred
(Continued)

UP
RIGHT ←——→ LEFT
DOWN to the impact absorbing member through the load transfer member.

8 Claims, 5 Drawing Sheets

(58) Field of Classification Search
USPC ................................ 296/209, 29, 30, 187.12
See application file for complete search history.

(56) References Cited

U.S. PATENT DOCUMENTS

| | | | | | |
|---|---|---|---|---|---|
| 10,464,406 | B2 * | 11/2019 | Kawabe | ................... | B60K 1/04 |
| 2016/0083017 | A1 * | 3/2016 | Sakaguchi | ......... | B62D 25/2036 |
| | | | | | 296/187.12 |
| 2019/0248423 | A1 | 8/2019 | Kato et al. | | |

| | | | |
|---|---|---|---|
| 2020/0062311 | A1 | 2/2020 | Kawase |
| 2021/0146766 | A1 | 5/2021 | Haberl et al. |
| 2021/0276621 | A1 | 9/2021 | Suzaki |

FOREIGN PATENT DOCUMENTS

| | | |
|---|---|---|
| DE | 102018206100 A1 | 10/2019 |
| JP | 2019-137354 A | 8/2019 |
| JP | 2019-166850 A | 10/2019 |
| JP | 2020-029150 A | 2/2020 |
| JP | 2021-138228 A | 9/2021 |

OTHER PUBLICATIONS

Chinese Office Action dated Jul. 21, 2025 issued in corresponding Chinese Patent Application No. 202280008636.3.
International Search Report dated Apr. 5, 2022 filed in PCT/JP2022/004064.

* cited by examiner

RIGHT ← → LEFT

DOWN

UP
RIGHT — LEFT
DOWN

FIG. 5

VEHICULAR SIDE STRUCTURE

TECHNICAL FIELD

Embodiments disclosed in the present application relate to a vehicle side structure.

BACKGROUND ART

JP-A-2020-29150 discloses a technology where an entire rocker (also called a side sill) as a part of a vehicle skeletal structure extending in a front-and-rear direction on the side of the lower part of a vehicle body is made of an aluminum alloy extruded material. The rocker has a structure where the interior is partitioned into a plurality of tubular small spaces extending in the front-and-rear direction and the plurality of small spaces is coupled. It is configured in such a manner that when the side of the vehicle is impacted, the small spaces are crushed due to impact load to absorb the impact energy.

SUMMARY OF INVENTION

However, in terms of such a rocker made of an aluminum alloy extruded material as above, a small space partitioning structure is likely to be complicated to efficiently absorb impact load. Therefore, it is desired to provide a structure that can transfer impact load efficiently to an impact absorbing member, using a material different from the aluminum alloy extruded material for at least a part of the structure.

One aspect is a vehicle side structure including: a rocker extending in a front-and-rear direction of a vehicle; and an impact absorbing member that is adjacent to the rocker to absorb the impact energy from the outside in a vehicle width direction. The rocker includes a tubular inner space formed by joining a rocker inner panel made of a steel sheet having a hat-shaped cross section that is open outward in the vehicle width direction, and a rocker outer panel made of a steel sheet having a hat-shaped cross-section that is open inward in the vehicle width direction with the openings thereof facing each other. The rocker includes an undersurface forming a step shape that is lower on an outer side than on an inner side in the vehicle width direction in such a manner that a downward extending space is formed in the inner space of the rocker. The impact absorbing member is placed adjacent to and inward in the vehicle width direction relative to the downward extending space. A load transfer member is provided within the downward extending space, the load transfer member having an elongated shape extending along the rocker and forming a closed cross-sectional portion by being joined to either the rocker inner panel or the rocker outer panel. Impact load from the outside in the vehicle width direction is transferred to the impact absorbing member through the load transfer member.

Depending on the embodiment, the load transfer member forms the closed cross-sectional portion by being joined to the rocker inner panel.

Depending on the embodiment, the load transfer member is joined to a lower end surface of the rocker inner panel.

Depending on the embodiment, the load transfer member forms the closed cross-sectional portion with a side wall surface facing the rocker outer panel, an upper wall surface extending from the side wall surface to the rocker inner panel, and a lower wall surface extending from the side wall surface to the rocker inner panel. Also, the rocker outer panel is provided, at positions adjacent to upper and lower sides of the side wall surface, with a pair of first beads extending along the front-and-rear direction of the vehicle, the pair of first beads protruding toward the inner space of the rocker at heights overlapping with the load transfer member.

Depending on the embodiment, the load transfer member forms the closed cross-sectional portion by being joined to the rocker outer panel.

Depending on the embodiment, the load transfer member includes a plurality of second beads extending along the vehicle width direction, the plurality of second beads being spaced apart in the front-and-rear direction of the vehicle.

Depending on the embodiment, the load transfer member includes a joint portion joined to the rocker inner panel or rocker outer panel by spot welding.

Depending on the embodiment, the impact absorbing member is formed with a honeycomb structure where a plurality of synthetic resin tubular bodies is coupled.

Depending on the embodiment, a rocker is made of a different material from an aluminum alloy extruded material, and impact load can be efficiently transferred to the impact absorbing member in the event of a collision in the vehicle width direction.

BRIEF DESCRIPTION OF THE DRAWINGS

FIG. 1 is a cross-sectional view schematically illustrating the lower part of a vehicle body according to one embodiment from the front in a front-and-rear direction of the vehicle.

FIG. 3 is an exploded perspective view of the structure of FIG. 2.

FIG. 4 is a cross-sectional view schematically illustrating a state where impact load is inputted into the rocker of the structure of FIG. 2.

FIG. 5 is a cross-sectional view schematically illustrating a state where impact load is inputted into a rocker of a structure according to another embodiment.

DESCRIPTION OF EMBODIMENTS

Figure 2:
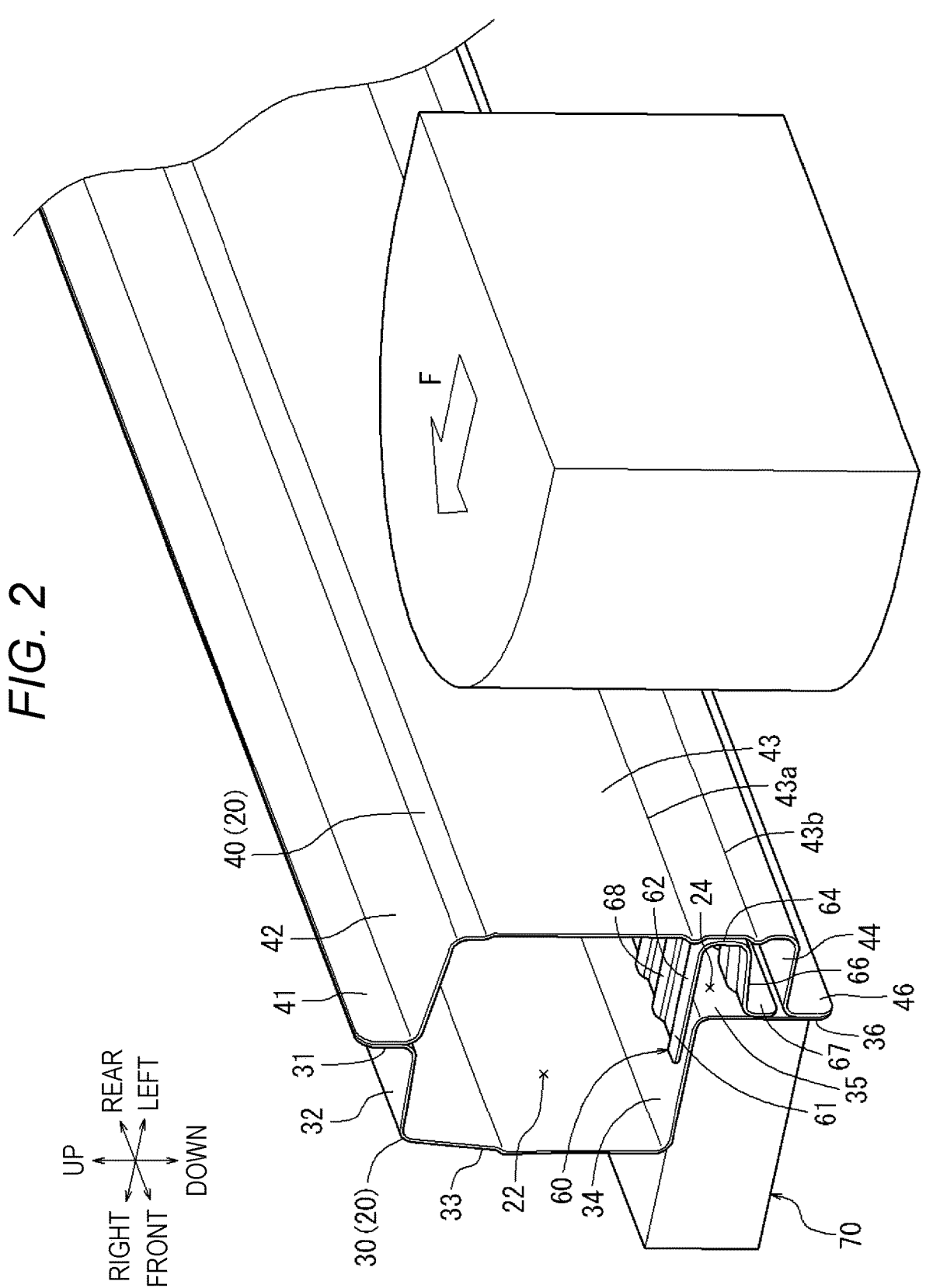
FIG. 2 is a perspective view of a structure including a rocker on the left side of the lower part of the vehicle body of FIG. 1.

Various embodiments are described hereinafter with reference to the drawings. Arrows illustrated as appropriate in the drawings indicate front, rear, up, down, left, and right relative to a vehicle. Moreover, in the following description, a front-and-rear direction of the vehicle may be simply referred to as the front-and-rear direction, and an up-and-down direction of the vehicle may be simply referred to as the up-and-down direction.

<Entire Configuration>

Figure 1:
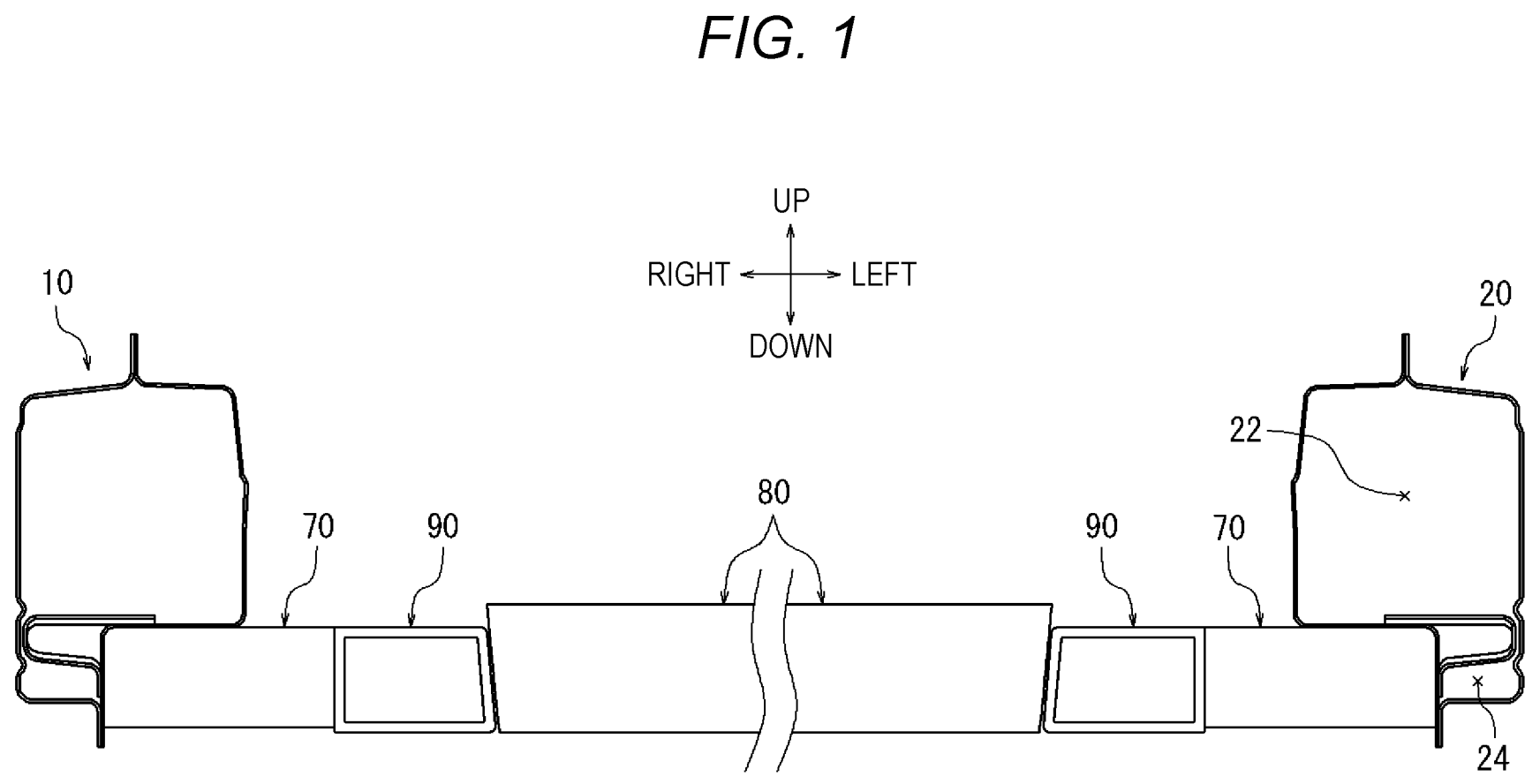

FIG. 1 is a cross-sectional view schematically illustrating the lower part of the vehicle body as one embodiment from the front. As illustrated in FIG. 1, the vehicle is, for example, an electric vehicle, a gasoline hybrid vehicle, or a fuel cell battery hybrid vehicle that runs with an unillustrated electric motor (motor) as a drive source. A battery pack 80 as a battery that stores power to be supplied to the electric motor is mounted below a floor panel (not illustrated) forming the floor of the lower part of the vehicle body. Moreover, an aluminum frame 90 extends along the front-and-rear direction of the vehicle on two sides of the battery pack 80 in a vehicle width direction. The aluminum frames 90 are formed of, for example, an aluminum alloy in a tubular shape by extrusion, drawing, or the like.

<Battery Pack>

The battery pack 80 usually includes a plurality of battery modules and a battery ECU (Electronic Control Unit), and is a battery system that is unitized in such a manner as to be mountable. The battery pack 80 is formed in, for example, a flat box shape. The battery module is configured in such a manner as to connect a plurality of battery cells (cells) that can be charged and discharged. The battery cells are rechargeable batteries such as lithium-ion batteries and nickel metal hydride batteries. The battery ECU is an electronic control unit for the battery pack 80.

<Side of Lower Part of Vehicle Body>

In the lower part of the vehicle body, the floor panel (not illustrated) extends along the vehicle width direction and the front-and-rear direction of the vehicle. Rockers 10 and 20 extend along the front-and-rear direction of the vehicle at two ends of the floor panel in the vehicle width direction, respectively. A cross member (not illustrated) runs between the right and left rockers 10 and 20 along the vehicle width direction above the floor panel. An impact absorbing member 70 is placed between each of the rockers 10 and 20 and each of the aluminum frames 90.

<Rockers>

Figure 3:
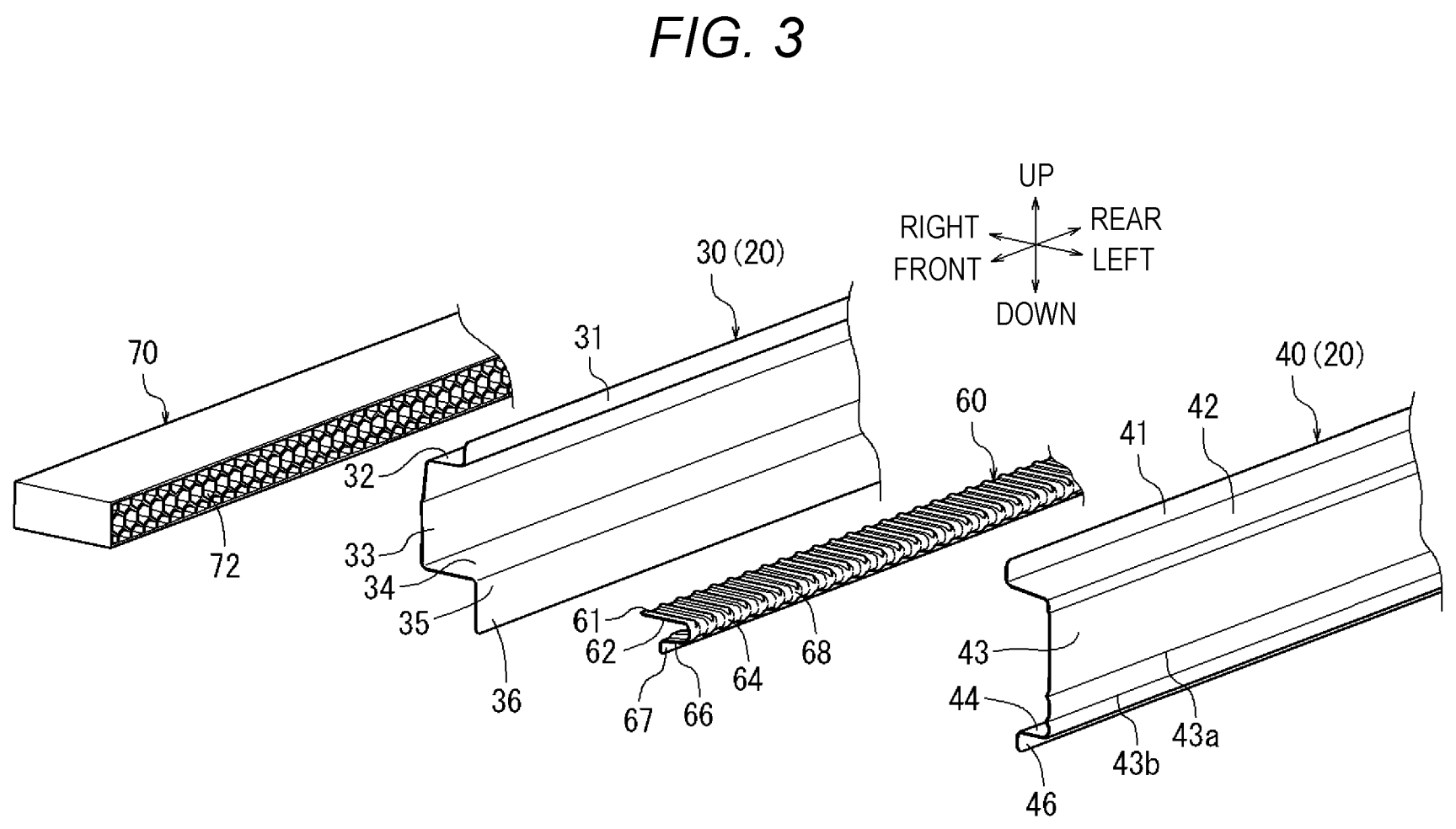
Figure 4:
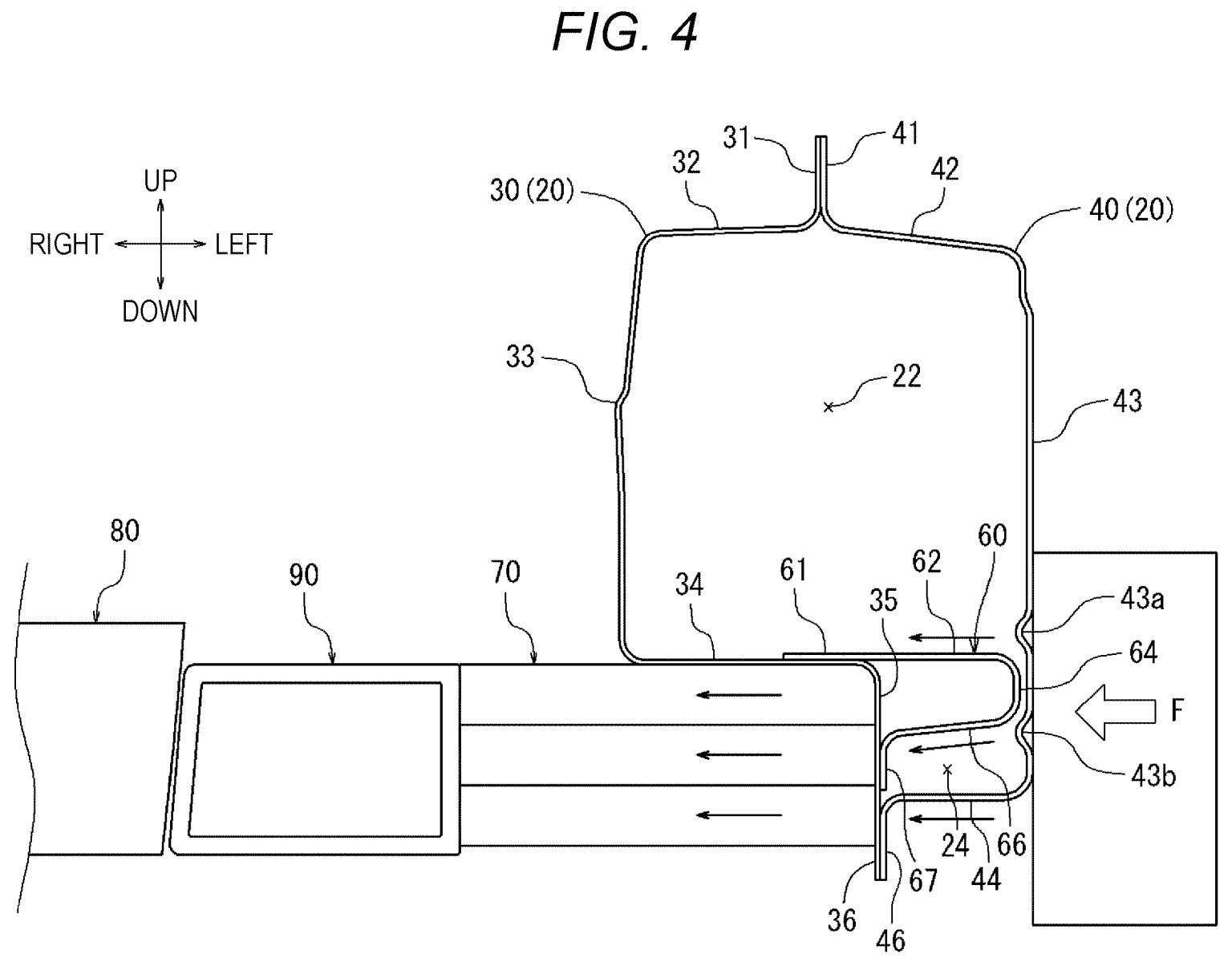

FIG. 2 is a perspective view illustrating a part of the left side of a vehicle side structure. FIG. 3 is an exploded perspective view illustrating a part of the left side of the vehicle side structure. FIG. 4 is a cross-sectional view schematically illustrating a state where impact load F is inputted into the rocker 20 of the vehicle to which the vehicle side structure is applied. The rockers 10 and 20 extend in the front-and-rear direction of the vehicle on the sides in the vehicle width direction and function as a part of the vehicle skeletal structure. The right and left rockers 10 and 20 are usually structured in such a manner as to be symmetric with respect to each other. Therefore, the detailed configuration is described by use of the left rocker 20 as a representative. The detailed description of the rocker 10 is omitted. As illustrated in FIGS. 2 to 4, the rocker 20 includes a tubular inner space 22 formed by aligning and joining a rocker inner panel 30 and a rocker outer panel 40 with openings thereof facing each other.

The rocker inner panel 30 is made of a steel sheet, and has a hat-shaped cross section that is open outward in the vehicle width direction. The rocker inner panel 30 can be formed with a hat-shaped cross section including an upper flange surface 31, an upper end surface 32, a side wall surface 33, a lower end surface 34, a rising surface 35, and a lower flange surface 36 from top down. The upper flange surface 31 extends in the up-and-down direction of the vehicle, and is joined to an upper flange surface 41 of the rocker outer panel 40 described below. The upper end surface 32 bends from a lower edge of the upper flange surface 31, and extends inward in the vehicle width direction. The side wall surface 33 bends from an inner edge of the upper end surface 32, and extends downward in the up-and-down direction of the vehicle. The lower end surface 34 bends from a lower edge of the side wall surface 33, and extends outward in the vehicle width direction. The rising surface 35 bends from an outer edge of the lower end surface 34, and extends downward in the up-and-down direction of the vehicle. The lower flange surface 36 extends from the rising surface 35, and is joined to a lower flange surface 46 of the rocker outer plane 40 described below.

The rocker outer panel 40 is made of a steel sheet, and has a hat-shaped cross section that is open inward in the vehicle width direction. Specifically, the rocker outer panel 40 can be formed with a hat-shaped cross section including the upper flange surface 41, an upper end surface 42, a side wall surface 43, a lower end surface 44, and the lower flange surface 46 from top down. The upper flange surface 41 extends in the up-and-down direction of the vehicle, and is joined to the upper flange surface 31 of the rocker inner panel 30 described above. The upper end surface 42 bends from a lower edge of the upper flange surface 41, and extends outward in the vehicle width direction. The side wall surface 43 bends from an outer edge of the upper end surface 42, and extends downward in the up-and-down direction of the vehicle. The lower end surface 44 bends from a lower edge of the side wall surface 43, and extends inward in the vehicle width direction. The lower flange surface 46 bends from an inner edge of the lower end surface 44, extends downward in the up-and-down direction of the vehicle, and is joined to the lower flange surface 36 of the rocker inner plane 30 described above.

In terms of the rocker 20, the rocker inner panel 30 and the rocker outer panel 40 are aligned with the openings thereof facing each other. The upper flange surface 31 and the upper flange surface 41 are joined by, for example, spot welding. Moreover, the lower flange surface 36 and the lower flange surface 46 are joined by, for example, spot welding. In this manner, the rocker 20 forms the tubular inner space 22.

The side wall surface 43 of the rocker outer panel 40 is set to be longer than the side wall surface 33 of the rocker inner panel 30. In other words, the length of the side wall surface 43 of the rocker outer panel 40 is substantially the same as the total length of the side wall surface 33 and the rising surface 35 of the rocker inner panel 30. Hence, when attention is given to the positional relationship in the up-and-down direction of the vehicle, the lower end surface 34 of the rocker inner panel 30 is located relatively higher, and the lower end surface 44 of the rocker outer panel 40 is located lower. Therefore, an undersurface of the rocker 20 has a step shape that extends in such a manner as to be relatively lower on the outer side than on the inner side in the vehicle width direction. As a result, the inner space 22 of the rocker 20 includes a downward extending space 24. The downward extending space 24 includes a load transfer member 60.

<Load Transfer Member>

The load transfer member 60 has an elongated shape extending along the rocker 20, and forms a closed cross-sectional portion by being joined to either the rocker inner panel 30 or the rocker outer panel 40. As one embodiment, the load transfer member 60 forms the closed cross-sectional portion by being joined to the rocker inner panel 30. The load transfer member 60 includes an upper joint surface 61, an upper wall surface 62, a side wall surface 64, a lower side wall surface 66, and a lower joint surface 67, and is joined to the rocker inner panel 30 to form the closed cross-sectional portion in the downward extending space 24.

A cross section obtained by cutting the load transfer member 60 itself in the vehicle width direction can generally have a horizontally oriented U shape, or more specifically the following configuration. The upper joint surface 61 is joined by spot welding to the lower end surface 34 of the rocker inner panel 30. The upper wall surface 62 extends from the upper joint surface 61, and extends from the rocker inner panel 30 side toward the rocker outer panel 40 side. The side wall surface 64 bends from an outer edge of the upper wall surface 62, and faces the rocker outer panel 40, spaced away from the rocker outer panel 40. The lower wall surface 66 bends from a lower edge of the side wall surface 66, and is folded back toward the rocker inner panel 30. The lower joint surface 67 bends from the lower wall surface 66, faces the rising surface 35 of the rocker inner panel 30, and then is joined to the rising surface 35 by spot welding. Moreover, the load transfer member 60 includes a plurality of beads 68 extending along the vehicle width direction, the plurality of beads 68 being spaced apart in the front-and-rear direction of the vehicle.

The rocker outer panel 40 is provided with an upper bead 43a and a lower bead 43b, which extend along the front-and-rear direction of the vehicle and protrude toward the inner space 22 of the rocker 20 at positions that are adjacent to the upper and lower sides of the side wall surface 64 in such a manner as to sandwich the side wall surface 64 of the load transfer member 60. The upper bead 43a and the lower bead 43b protrude further inward in the vehicle width direction beyond the side wall surface 64, and are formed at heights that overlap with the load transfer member 60.

<Impact Absorbing Member>

The impact absorbing member 70 is adjacent to the rocker 20 so that it has a function of absorbing impact energy from the outside in the vehicle width direction. The impact absorbing member 70 is placed at a position sandwiched between the downward extending space 24 of the rocker 20 and the aluminum frame 90. The impact absorbing member 70 is made of, for example, synthetic resin, and as a whole can be formed in a box shape. As one embodiment, the impact absorbing member 70 can be formed with a honeycomb structure where a plurality of hollow tubular bodies 72 extending in the vehicle width direction is coupled. The impact absorbing member 70 can be formed with, for example, a honeycomb structure where the hollow regular hexagonal tubular bodies 72 are coupled.

<Effects of Rocker on Impact Load>

FIG. 4 is a cross-sectional view schematically illustrating a state where the impact load F is inputted into the rocker 20 of the vehicle to which the above-mentioned vehicle side structure is applied. A part of the impact load F applied from the outside in the vehicle width direction is transferred from the side wall surface 43 of the rocker 20 to a lower portion of the impact absorbing member 70 through the lower end surface 44. Moreover, when the side wall surface 43 of the rocker 20 comes into contact with the side wall surface 64 of the load transfer member 60, a part of the impact load F is transferred to an upper portion of the impact absorbing member 70 through the upper wall surface 62, and also transferred to a middle portion of the impact absorbing member 70 through the lower wall surface 66. The impact load F that is applied when an obstacle having a narrow width such as a pole is struck in the side of the vehicle is locally concentrated on a part of the rocker 20 in a length direction thereof. However, with the vehicle side structure of the above-mentioned embodiment, the load F is spread and transferred throughout the impact absorbing member 70 in both of the up-and-down direction and the front-and-rear direction through the rocker 20 and the load transfer member 60 so that the impact energy can be efficiently absorbed. Moreover, the rocker 20 can form a skeleton with a simple structure made of a steel sheet in contrast to an aluminum alloy extruded material.

<Other Embodiments>

Figure 5:
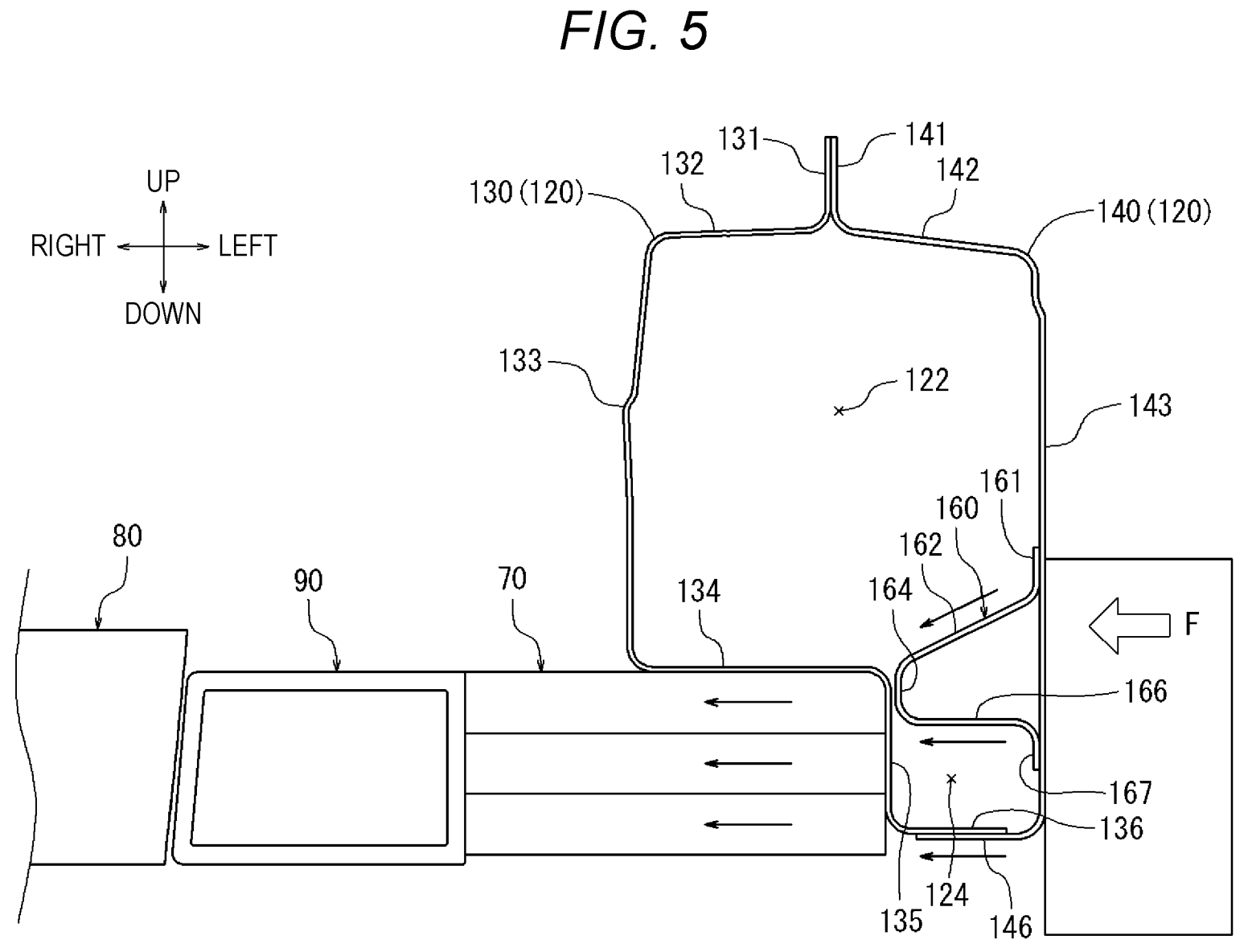

As illustrated in FIG. 5, a rocker 120 and a load transfer member 160 can be modified into various forms. For example, in terms of the rocker 120, a flange form that joins a rocker inner panel 130 and a rocker outer panel 140 together can be modified. As one embodiment, as in lower flange surfaces 136 and 146, a form where the flange surfaces bend in directions in which they approach each other, and are aligned and joined to each other is also acceptable. Various forms can be similarly applied also to upper flange surfaces 131 and 141. Moreover, another embodiment, the load transfer member 160 may be a member forming a closed cross-sectional portion by being joined to the rocker outer panel 40. Moreover, the rocker 120 may be provided with a configuration similar to the upper bead 43a and the lower bead 43b. The load transfer member 160 may be provided with a configuration similar to the bead 68. Also in these embodiments, the impact load F that is applied when a pole is struck in the side of the vehicle is spread and transferred throughout the impact absorbing member 70 in both of the up-and-down direction and the front-and-rear direction through the rocker 120 and the load transfer member 160.

<Advantages of Embodiments>

Lastly, the advantages of the above embodiments are listed.

According to the above embodiments, the rocker 20 forms the tubular inner space 22 with the rocker inner panel 30 and the rocker outer panel 40, which are made of a steel sheet having a hat-shaped cross section. The undersurface of the rocker 20 forms a step shape that is lower on the outer side than on the inner side in the vehicle width direction. Therefore, the downward extending space 24 is formed in the inner space 22 of the rocker 20. The impact absorbing member 70 is placed adjacent to and inward in the vehicle width direction relative to the downward extending space 24. The downward extending space 24 includes the load transfer member 60 that has an elongated shape extending along the rocker 20 and forms the closed cross-sectional portion by being joined to either the rocker inner panel 30 or the rocker outer panel 40. The impact load F from the outside in the vehicle width direction is transferred to the impact absorbing member 70 through the load transfer member 60. With the above configuration, the rocker 20 is made of a material different from an aluminum alloy extruded material and can transfer the impact load F efficiently to the impact absorbing member 70 in the event of a collision in the vehicle width direction.

Depending on the embodiment, the load transfer member 60 forms the closed cross-sectional portion by being joined to the rocker inner panel 30, which facilitates the setting of the placement position of the closed cross-sectional portion in the downward extending space 24. Hence, it is possible to have a structure where the impact load F can be more efficiently transferred to the impact absorbing member 70.

Depending on the embodiment, the load transfer member 60 is joined to the lower end surface 34 of the rocker inner panel 30 and therefore is joined on the surface along a direction in which the impact load F is applied (the horizontal direction). As a result, the load transfer member can be structured in such a manner as to resist falling in the up-and-down direction.

Depending on the embodiment, the load transfer member 60 forms the closed cross-sectional portion with the side wall surface 64 facing the rocker outer panel 40, the upper wall surface 62 extending from the side wall surface 64 to the rocker inner panel 30, and the lower wall surface 66 extending from the side wall surface 64 to the rocker inner panel 30. The rocker outer panel 40 is provided, at the positions adjacent to the upper and lower sides of the side wall surface 64, with the upper bead 43a and the lower bead 43b, which extend along the front-and-rear direction of the vehicle and protrude toward the inner space 22 of the rocker 20. The upper bead 43a and the lower bead 43b are formed at the heights that overlap with the load transfer member 60.

Hence, fall of the load transfer member 60 in the up-and-down direction can be prevented.

Depending on the embodiment, the load transfer member 60 forms the closed cross-sectional portion by being joined to the rocker outer panel 40. Hence, it is also possible to have an aspect where the load transfer member 60 is joined to the rocker outer panel depending on the shape of the downward extending space. Therefore, it is possible to promote an increase in design flexibility.

Depending on the embodiment, the load transfer member 60 is formed with the plurality of beads 68 extending along the vehicle width direction, the plurality of beads 68 being spaced apart in the front-and-rear direction of the vehicle. Therefore, stiffness against the impact load F applied in the vehicle width direction can be increased.

Depending on the embodiment, the load transfer member 60 includes the upper joint surface 61 and the lower joint surface 67, which are joined to either the rocker inner panel 30 or the rocker outer panel 40 by spot welding. Therefore, efficient joining is enabled.

Depending on the embodiment, the impact absorbing member 70 is formed with the honeycomb structure where the plurality of synthetic resin tubular bodies 72 is coupled. Therefore, weight reduction can be promoted.

Up to this point the specific embodiments have been described. However, the present technology is not limited to these embodiments. Those skilled in the art can make various modifications, replacements, and improvements.

What is claimed is:

1. A vehicle side structure comprising:
   a rocker extending in a front-and-rear direction of a vehicle; and
   an impact absorbing member adjacent to the rocker, wherein
   the rocker includes a tubular inner space formed by joining a rocker inner panel made of a steel sheet having a hat-shaped cross section that is open outward in a vehicle width direction, and a rocker outer panel made of a steel sheet having a hat-shaped cross-section that is open inward in the vehicle width direction with the openings thereof facing each other, and
   the rocker includes an undersurface forming a step shape that is lower on an outer side than on an inner side in the vehicle width direction in such a manner that a downward extending space is formed in the inner space of the rocker,
   the impact absorbing member is placed adjacent to and inward in the vehicle width direction relative to the downward extending space to be sandwiched between the downward extending space of the rocker and an aluminum frame extending in a front-and-rear direction, the impact absorbing member formed of a resin honeycomb structure that couples a plurality of synthetic resin tubular bodies extending in the vehicle width direction,
   a load transfer member is provided within the downward extending space, the load transfer member having an elongated shape with an open cross-section extending along the rocker and forming a closed cross-sectional portion by being joined to either the rocker inner panel or the rocker outer panel, and
   impact load from the outside in the vehicle width direction is transferred to the impact absorbing member through the load transfer member.

2. The vehicle side structure according to claim 1, wherein the load transfer member forms the closed cross-sectional portion by being joined to the rocker inner panel.

3. The vehicle side structure according to claim 2, wherein the load transfer member is joined to a lower end surface of the rocker inner panel.

4. The vehicle side structure according to claim 2, wherein the load transfer member forms the closed cross-sectional portion with a side wall surface facing the rocker outer panel, an upper wall surface extending from the side wall surface to the rocker inner panel, and a lower wall surface extending from the side wall surface to the rocker inner panel, and the rocker outer panel is provided, at positions adjacent to upper and lower sides of the side wall surface, with a pair of beads extending along the front-and-rear direction of the vehicle, the pair of beads protruding toward the inner space of the rocker at heights overlapping with the load transfer member.

5. The vehicle side structure according to claim 1, wherein the load transfer member forms the closed cross-sectional portion by being joined to the rocker outer panel.

6. The vehicle side structure according to claim 1, wherein the load transfer member includes a plurality of beads extending along the vehicle width direction, the plurality of beads being spaced apart in the front-and-rear direction of the vehicle.

7. The vehicle side structure according to claim 1, wherein the load transfer member includes a joint portion joined to the rocker inner panel or rocker outer panel by spot welding.

8. The vehicle side structure according to claim 1, wherein the honeycomb structure includes hollow regular hexagonal tubular bodies.

* * * * *